(12) United States Patent
Yashiro

(10) Patent No.: US 7,144,677 B2  
(45) Date of Patent: Dec. 5, 2006

(54) OPTICAL RECORDING METHOD AND OPTICAL RECORDING MEDIUM

(75) Inventor: Tohru Yashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 160 days.

(21) Appl. No.: 10/100,198

(22) Filed: Mar. 18, 2002

(65) Prior Publication Data

US 2003/0063539 A1    Apr. 3, 2003

(30) Foreign Application Priority Data

Mar. 21, 2001  (JP) .............................. 2001-081483  
Apr. 12, 2001  (JP) .............................. 2001-114342  
Jun. 13, 2001  (JP) .............................. 2001-179141

(51) Int. Cl.  
*G11B 7/24*    (2006.01)

(52) U.S. Cl. ................ 430/270.16; 430/945; 428/64.8; 389/59.11

(58) Field of Classification Search .......... 430/276.11, 430/270.16, 945; 369/59.11; 428/64.8  
See application file for complete search history.

(56) References Cited

U.S. PATENT DOCUMENTS

| | | | |
|---|---|---|---|
| 4,142,210 A * | 2/1979 | Otobe et al. .................. 369/61 |
| 4,425,637 A | 1/1984 | Tanaka et al. |
| 5,111,443 A | 5/1992 | Yokogawa |
| 5,169,745 A | 12/1992 | Yashiro et al. .............. 490/945 |
| 5,238,722 A | 8/1993 | Yashiro et al. .............. 430/945 |
| 5,242,730 A | 9/1993 | Yashiro et al. .............. 369/298 |
| 5,252,372 A | 10/1993 | Yashiro et al. .............. 430/945 |
| 5,441,848 A | 8/1995 | Aoi et al. |
| 5,532,033 A | 7/1996 | Yashiro ...................... 428/64.1 |
| 5,580,696 A | 12/1996 | Yahsiro ................. 430/270.17 |
| 5,789,138 A | 8/1998 | Yashiro ................. 430/270.16 |
| 5,802,032 A * | 9/1998 | Jacobs et al. ............ 369/59.11 |
| 5,876,820 A * | 3/1999 | Koike et al. ................ 428/64.1 |
| 5,882,757 A | 3/1999 | Yashiro ...................... 428/64.1 |
| 5,932,721 A | 8/1999 | Yashiro et al. .............. 540/139 |
| 5,968,708 A * | 10/1999 | Yashiro et al. ........... 430/270.1 |
| 6,043,355 A | 3/2000 | Yashiro et al. .............. 540/139 |
| 6,045,971 A | 4/2000 | Yashiro ................. 430/270.16 |
| 6,137,769 A | 10/2000 | Sawada et al. .......... 369/275.3 |
| 6,459,666 B1 * | 10/2002 | Yokoi ...................... 369/47.15 |
| 6,469,963 B1 | 10/2002 | Sawada et al. ............ 369/47.1 |
| 6,704,269 B1 * | 3/2004 | Ogawa ........................ 369/116 |

FOREIGN PATENT DOCUMENTS

| | | |
|---|---|---|
| EP | 0289260 A2 | 11/1988 |
| EP | 0849726 A1 | 6/1998 |
| JP | 59-056261 * | 3/1984 |
| JP | 2042652 | 2/1990 |

(Continued)

OTHER PUBLICATIONS

Marchant, "Optical recording: a technical review", (1990), pp. 257-263.*

(Continued)

*Primary Examiner*—Martin Angebranndt  
(74) *Attorney, Agent, or Firm*—Cooper & Dunham LLP

(57) ABSTRACT

This invention provides a recording method for an optical recording medium having superior high-speed recording, and a playable optical recording medium in which data pits are formed by this recording method. For this purpose, recording materials having special thermal decomposition characteristics are used for the recording layer of the optical recording medium, and the recording pulse pattern at the inner circumference and outer circumference of the optical recording medium is adjusted to be suitable for high-speed recording conditions.

21 Claims, 2 Drawing Sheets

FOREIGN PATENT DOCUMENTS

| | | | |
|---|---|---|---|
| JP | 05-001272 | * | 1/1993 |
| JP | 05-012671 | * | 1/1993 |
| JP | 6338059 | | 12/1994 |
| JP | 1064065 | | 3/1998 |

OTHER PUBLICATIONS

Machine translation of JP 05-001272.*

* cited by examiner

OPTICAL RECORDING METHOD AND OPTICAL RECORDING MEDIUM

BACKGROUND OF THE INVENTION

1. Field of the Invention

This invention relates to an optical recording method and optical recording medium. In particular, it relates to a method of recording and reproducing an optical recording disk such as a CD-R or DVD-R, and to an optical recording medium formed by data pits using this recording method.

2. Description of the Related Art

In recent years, with the spread of optical recording media such as CD (compact disks) exclusively for read-out, CDs which can be recorded (CD-R, CD-RW) are now also becoming widespread.

Unlike the CD of the prior art, users can record information on a CD-R or on a CD-RW, and the signal after recording can be reproduced by commercial CD players as it complies with the standard CD specification.

A method of obtaining an optical recording medium for CD-R is for example proposed in Japanese Patent Application Laid-Open 2-42652, wherein a recording layer is provided by spin coating a dye on a substrate and then providing a metal reflecting layer on the back.

The speed of recording drives has increased from the flat speed (approximately 1.3 m/s), and higher performance 4–12 speed (approximately 15.6 m/s) recording models are now becoming widespread.

However, if prior art CD-R media are used for recording at high speeds such as 12 speed, the signal quality deteriorated compared to flat speed recording. Specifically, when recording at high speeds, there is a narrow margin relative to the recording power, and recording errors occurred depending on the combination of recorder and player.

Hence, in Japanese Patent Application Publication No. 2858067, a method is proposed where an EFM signal is recorded on a CD-R at a pulse width of (n+P) 231.4 ns×Vr/Vw, where n=3, 4, 5, 6, 7, 8, 9, 10, 11 and −0.5<P<−0.2, and the pulse width is made shorter the faster the recording speed. Also, in Japanese Patent Application Laid-Open 10-64065, it is proposed to reduce the value of the bottom power of the recording pulse the faster the recording speed.

It is therefore an object of this invention to resolve the problems in the prior art in view of the above situation, and achieve the following purposes.

Specifically, it is an object of this invention to provide a recording method for an optical recording medium which is very well suited to high-speed recording, and to a playable optical recording medium comprising data pits formed by this recording method.

SUMMARY OF THE INVENTION

As a result of intensive studies carried out by the Inventor to resolve the above problems, it was discovered that the reason why the margin became narrower relative to the recording power in high-speed recording was that, in high-speed recording as compared to flat speed recording, the recording pits formed in the recording layer formed at high speed. Therefore, thermal interference to the front and back of the recording pits and between adjacent tracks increased, and as the recording pits deviated from the predetermined length, signal jitter increased.

In this case, the effect of thermal interference is larger the larger the recording power. Also, this effect is different at the inner circumference and outer circumference of the optical recording medium. This is due to the fact that dye containing recording layers are generally formed by the spin coating method.

In the spin coating method, it is difficult to control the dye film thickness or the extent to which dye is filled in the guide grooves formed on the substrate, so a difference in the film-forming state of the dye film appears between the inner and outer circumferences, and the effect of thermal interference varies. Further, the shape of the guide grooves formed on the substrate also affects the thermal interference. With deeper grooves and/or narrower grooves, a thermal interference prevention effect is easily obtained, and due to the difference in the groove shape at the inner and outer circumferences, the effect of thermal interference varies.

It is therefore an object of this invention to resolve this problem by adjusting the thermal decomposition properties of the recording layer, and adjusting the inner/outer difference of the media and recording pulse pattern so that they are suitable for high-speed recording.

In a first aspect of the optical recording method of this invention, a recordable optical recording medium is used wherein a recording layer comprising a dye material which has a thermal decomposition temperature of 200° C. to less than 450° C. is provided, either directly or at least intervening another layer, on a substrate having a guide groove on at least its front surface, and a reflecting layer is provided, either directly or at least intervening another layer, on the front surface side of this recording layer. By irradiating the rear surface side of the substrate with a recording light, recording marks having modulated pit lengths are formed on the recording layer, and the shortest signal recording pulse (3T pulse) length of the recording signal is varied between the inner circumference and outer circumference of the optical recording medium.

In a second aspect of the optical recording method of this invention, a recordable optical recording medium is used wherein a recording layer comprising a dye material which has a thermal decomposition temperature of 20° C. to less than 450° C. is provided, either directly or at least intervening another layer, on a substrate having a guide groove on at least its front surface, and a reflecting layer is provided, either directly or at least intervening another layer, on the front surface side of this recording layer. By irradiating the rear surface side of the substrate with a recording light, recording marks having modulated pit lengths are formed on the recording layer, and the second shortest signal recording pulse (4T pulse) length of the recording signal is varied between the inner circumference and outer circumference of the optical recording medium.

The optical recording medium of this invention comprises data pits which are formed by the optical recording method of this invention.

DESCRIPTION OF THE PREFERRED EMBODIMENTS

<Optical Recording Method>

Figure 1:
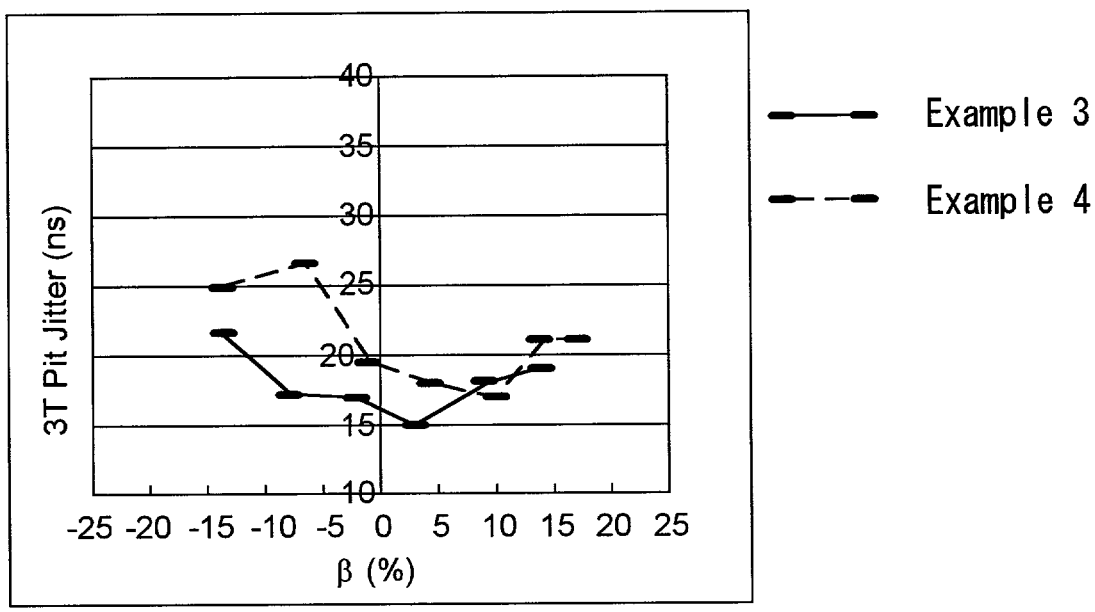
FIG. 1 is a graph showing the relation between a β range and jitter in Examples 3, 4.

In a first aspect of the optical recording method of this invention, a recordable optical recording medium is used wherein a recording layer comprising a dye material which has a thermal decomposition temperature of 200° C. to less than 450° C. is provided, either directly or at least intervening another layer, on a substrate having a guide groove on at least its front surface, and a reflecting layer is provided, either directly or at least intervening another layer, on the front surface side of this recording layer. By irradiating the rear surface side of the substrate with a recording light, recording marks having modulated pit lengths are formed on the recording layer, and the shortest signal recording pulse (3T pulse) length of the recording signal is varied between the inner circumference and outer circumference of the optical recording medium.

Here, in this invention, the inner circumference and outer circumference of the optical recording medium depend on the type of optical recording medium and cannot be specified uniquely. For example, in the case of CD-R, inner circumference refers to a disk radius of 25–50 mm, and outer circumference refers to a disk radius of 50–58 mm, however, disk radii of the inner circumference and the outer circumference are not the same.

In the optical recording method according to the first aspect of this invention, the inner/outer difference of the optical recording medium (disk) is adjusted by varying the shortest signal recording pulse (3T pulse) length between the inner circumference and the outer circumference of the optical recording medium.

In this case, it is preferred that the variation amount of the 3T pulse is 5% to 20%, and it is preferred that the inner/outer variation of the recording pulse is such that the 3T pulse is longer at the outer circumference than at the inner circumference of the recording medium.

In general, in spin-coated films, the dye film thickness tends to be larger at the outer circumference than at the inner circumference of the optical recording medium, and when dye is filled in the guide groove, it is easier to fill on the outer circumference. In such a case, it is preferable to lengthen the recording pulse at the outer circumference of the optical recording medium according to the increased amount of dye film thickness.

Here, the variation amount of the 3T pulse length can be calculated as follows.

Variation amount of 3T pulse length (%)=[(3T pulse length at outer circumference–3T pulse length at inner circumference)/3T pulse length at outer circumference]×100 where, the inner circumference is a disk radius of 25 mm and the outer circumference is a disk radius of 55 mm.

In the case where the recording signal is a CD signal, it is preferred that the shortest signal recording pulse (3T pulse) length of the CD signal satisfies the following condition.

shortest signal recording pulse (3T pulse) length=(3−X)×231.4 ns where, $0.25 \leq 0.08 \times Vw/Vr + X \leq 1.25$, Vw is the recording speed, and Vr is the standard reproducing speed for CD (1.2 m/s–1.4 m/s), and satisfies $-2<X<2$.

The faster the recording speed or the shorter the recording signal pulse, the more thermal interference tends to occur in the recording pits. Hence, the shortest 3T pulse length is controlled to match the recording speed by EFM which is the CD signal.

In the above equation, the spread of the recording pits on the recording layer is suppressed by controlling the recording pulse to be longer the faster the recording speed. As a result, satisfactory recording/reproducing signal characteristics are obtained even under the high-speed recording conditions.

In the optical recording method according to the second aspect of this invention, a recordable optical recording medium is used wherein a recording layer comprising a dye material which has a thermal decomposition temperature of 200° C. to less than 450° C. is provided, either directly or at least intervening another layer, on a substrate having a guide groove on at least its front surface, and a reflecting layer is provided, either directly or at least intervening another layer, on the front surface side of this recording layer. By irradiating the rear surface side of the substrate with a recording light, recording marks having a modulated pit length are formed on the recording layer, and the second shortest signal recording pulse (4T pulse) length of the recording signal is varied between the inner circumference and outer circumference of the optical recording medium.

In the optical recording method according to the second aspect of this invention, the inner/outer difference of the optical recording medium (disk) is adjusted by varying the second shortest signal recording pulse (4T pulse) length between the inner circumference and the outer circumference of the optical recording medium.

In this case, it is preferred that the variation amount of the 4T pulse length is 5% to 20%, and it is preferred that the inner-outer variation of the recording pulse is such that the 4T pulse is longer at the outer circumference than at the inner circumference of the recording medium.

Here, the variation amount of the 4T pulse length can be calculated as follows.

Variation amount of 4T pulse length (%)=[(4T pulse length at outer circumference–4T pulse length at inner circumference)/4T pulse length at outer circumference]×100 where, the inner circumference is a disk radius of 25 mm and the outer circumference is a disk radius of 55 mm.

In the case where the recording signal is a CD signal, it is preferred that the second shortest signal recording pulse (4T pulse) length of the CD signal satisfies the following condition.

Second shortest signal recording pulse (4T pulse) length=(4−X)×231.4 ns where, $0.25 \leq 0.08 \times Vw/Vr + X \leq 1.25$, Vw is the recording speed, and Vr is the standard reproducing speed for CD (1.2m/s–1.4 nm/s), and satisfies $-2<X<2$.

Hence, satisfactory recording/reproducing signal characteristics can be obtained under the same high-speed recording conditions as in the aforementioned first aspect of the invention by controlling the second shortest recording pulse (4T pulse) length in the CD signal.

<Optical Recording Medium>

The optical recording medium of this invention contains a recording layer of a dye material having a thermal decomposition temperature of 200° C. to less than 450° C. provided, either directly or at least intervening another layer, on a substrate having a guide groove on at least the front surface and a reflecting layer is provided, either directly or at least intervening another layer, on the front surface side of this recording layer.

There is no particular limitation on the dye material comprising the recording layer provided that its thermal decomposition temperature is from 200° C. to less than 450° C., and it may be chosen suitably according to the purpose. Examples are cyanine dyes, phthalocyanine compounds, pyrilium/thiopyrilium dyes, azulenium dyes, squarilium dyes, metal complex salts of Ni, Cr or the like, naphthoquinone dyes/anthraquinone dyes, indophenol dyes, indoaniline dyes, triphenylmethanedyes, triallylmethanedyes, aminium/diimonium dyes and nitroso compounds. Of these, phthalocyanine compounds represented by the following formula (1) are preferred as they have excellent durability to light and heat, and a thermal decomposition temperature of less than 450° C. can easily be obtained.

In this invention, the thermal decomposition temperature of the dye material is preferably from 200° C. to less than 450° C., but more preferably from 250° C. to 400° C.

When the thermal decomposition temperature is above 450° C., it is difficult to obtain satisfactory recording sensitivity under high-speed recording conditions. On the other hand, when the thermal decomposition temperature is less than 200° C., the recording pits tend to suffer thermal interference and it may be difficult to control them by a recording pulse pattern.

Here, in this specification, the "thermal decomposition temperature" is the heat amount (DSC) variation peak temperature or the mass variation (Tg) start temperature when the temperature is raised at 10° C./min by a thermal balance.

It is preferred that the phthalocyanine compound is a phthalocyanine compound having the following general formula (1):

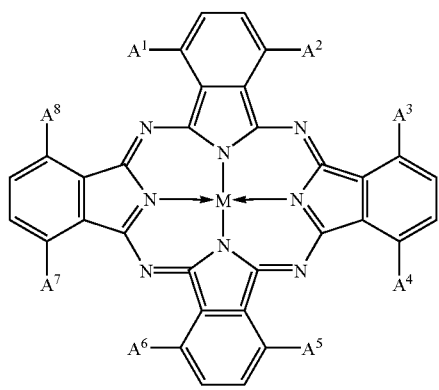

(1)

(in the formula, M represents a bivalent metal atom, mono-substituted trivalent metal atom, disubstituted tetravalent metal atom or oxymetal, and among $A^1$ and $A^2$, $A^3$ and $A^4$, $A^5$ and $A^6$, $A^7$ and $A^8$, one of the pair represents an alkyl group, alkylthio group, alkoxy group, aryl group, aryloxy group or arylthio group, and the other of the pair represents halogen, a nitro group, a CN group or a hydrogen atom).

The metal M in the center may be a bivalent metal atom, mono-substituted trivalent metal atom, disubstituted tetravalent metal atom or oxymetal.

The bivalent metal may for example be $Cu^{2+}$, $Zn^{2+}$, $Fe^{2+}$, $Co^{2+}$, $Ni^{2+}$, $Ru^{2+}$, $Rh^{2+}$, $Pd^{2+}$, $pt^{2+}$, $Mn^{2+}$, $Mg^{2+}$, $Ti^{2+}$, $Be^{2+}$, $Hg^{2+}$, $Pb^{2+}$, $Sn^{2+}$.

The mono-substituted trivalent metal may for example be Al—Cl, Al—Br, Al—F, Al—I, Ga—Cl, Ga—F, Ga—I, Ga—Br, In—Cl, In—Br, In—I, In—F, Tl—Cl, Tl—Br, Tl—I, Tl—F, Al—$C_6H_5$, Al—$C_6H_4(CH_3)$, In—$C_6H_5$, In—$C_6H_4$ ($CH_3$), In—$C_{10}H_7$, Mn(OH), Mn(O$C_6H_5$), Mn(OSi $(CH_3)_3$), FeCl, RuCl.

The disubstituted tetravalent metal may for example be $CrCl_2$, $SiCl_2$, $SiBr_2$, $SiF_2$, $SiI_2$, $ZrCl_2$, $GeCl_2$, $GeBr_2$, $GeI_2$, $GeF_2$, $SnCl_2$, $SnBr_2$, $SnI_2$, $SnF_2$, $TiCl_2$, $TiBr_2$, $TiF_2$, $Si(OH)_2$, $Ge(OH)_2$, $Zr(OH)_2$, $Mn(OH)_2$, $Sn(OH)_2$, $TiR_2$, $CrR_2$, $SiR_2$, $SnR_2$, $GeR_2$, (where R is alkyl group, phenyl group, naphthyl group and their derivatives), $Si(OR')_2$, $Sn(OR')_2$, $Ge(OR')_2 Ti(OR')_2$, $Cr(OR')_2$, (where R' is alkyl group, phenyl group, naphthyl group, trialkylsilyl group, dialkylalkoxysilyl group and their derivatives), or $Sn(SR")_2$, $Ge(SR")_2$, (where R" is alkyl group, phenyl group, naphthyl group and their derivatives).

The oxymetal may for example be VO, MnO or TiO.

It is preferred that the central metal atom M is a metal atom or metal oxide chosen from Zn, Ni, Cu, Pd, VO or TiO. These compounds of M are easy to manufacture, and have good light absorption characteristics.

The substituent groups $A^1$–$A^8$ maybe alkyl group, alkylthio group, alkoxy group, aryl group, aryloxy group, arylthio group, halogen, nitro group, CN group or hydrogen atom. In particular, straight chain, branched or cyclic alkyl, alkoxy or alkylthio groups having 1–10 carbon atoms, and aryl, aryloxy or arylthio groups having 6–20 carbon atoms, halogen atom, nitro group, CN group or hydrogen atom are preferred.

Examples of alkyl groups having 1 to 10 carbon atoms are methyl, ethyl, propyl, n-butyl, iso-butyl, tert-butyl, sec-butyl, n-pentyl, iso-pentyl, neo-pentyl, 1-methylbutyl, 2-methylbutyl, n-hexyl, 2-ethylbutyl, 3-methylpentyl, 2,3-dimethylbutyl, n-heptyl, n-octyl, 2-ethylhexyl, n-nonyl, 2,5,5-trimethylhexyl, n-decyl, 4-ethyloctyl, 4-ethyl-4,5 dimethylhexyl, n-undecyl, n-dodecyl, 1,3,5,7-tetramethyloctyl, 4-butyloctyl, 6,6-diethyloctyl, n-tridecyl, 6-methyl-4-butyloctyl, n-tetradecyl, n-pentadecyl, cyclohexyl, adamanthyl, norbornyl and 2-chlorobutyl.

Examples of alkoxy groups having 1–10 carbon atoms are methoxy, ethoxy, propyloxy, iso-propyloxy, n-butyloxy, iso-butyloxy, tert-butyloxy, sec-butyloxy, n-pentyloxy, neo-pentyloxy, iso-pentyloxy, tert-pentyloxy, 1-methylbutyloxy, 2-methylbutyloxy, n-hexyloxy, cyclohexyloxy, adamanthyloxy, norbornyloxy and 2-chlorobutyloxy.

Examples of alkylthio groups having 1–10 carbon atoms are methylthio, ethylthio, n-propylthio, iso-propylthio, n-butylthio, iso-butylthio, tert-butylthio, sec-butylthio, n-pentylthio, iso-pentylthio, neo-pentylthio, 1,2-dimethylpropylthio, n-hexylthio, 1-ethyl-2-methylpropylthio, 2-ethylbutylthio, cyclohexylthio, 2-methyl-1-iso-propylthio, n-heptylthio, 2-methylhexylthio, 1-ethylpentylthio, n-octylthio, 2-ethylhexylthio, 3-methyl-1-iso-propylbutylthio, n-nonylthio, 3-methyl-1-iso-butylbutylthio, 3,5,5-trimethylhexylthio, 2-chlorobutylthio and 4-tert-butylcyclohexylthio.

Examples of aryl groups having 6–20 carbon atoms are phenyl, 2-methylphenyl, 2,4-dimethylphenyl, 2,4,6-trimethylphenyl, 2-iso-propylphenyl, 4-bromophenyl, 2,6-dichlorophenyl and naphthyl.

Examples of aryloxy groups having 6–20 carbon atoms are phenoxy, 2-methylphenoxy, 2,4-dimethylphenoxy, 2,4,6-trimethylphenoxy, 2-iso-propylphenoxy, 4-bromophenoxy, 2,6-dichlorophenoxy and naphthyloxy.

Examples of arylthio groups having 6–20 carbon atoms are phenylthio, 2-methylphenylthio, 2,4-dimethylphenylthio, 2,4,6-trimethylphenylthio, 2-iso-propylphenylthio, 4-bromophenylthio, 2,6-dichlorophenylthio and naphthylthio.

Examples of halogen atoms are F, Cl, Br, I.

Of the substituent groups $A^1$–$A^8$, straight chain or branched alkyl, alkoxy or alkylthio groups having 4–10 carbon atoms, or aryl, aryloxy and arylthio groups having 6–15 carbon atoms, are particularly to be preferred.

These compounds having substituent groups have excellent solubility and are easily coated to form a film. Also, if the number of carbon atoms is larger than this number, the degree of light absorption per unit film thickness of the recording layer falls, and it becomes difficult to obtain suitable optical characteristics (complex refractive index).

Also, other groups may be added to the substituent groups $A^1$–$A^8$ to improve recording sensitivity, adjust the absorption wavelength of the recording layer and improve the solubility in the coating solvent.

Examples of other groups are sulfonic acids, sulfonic acid amines, carboxylic acids, amides and imides.

The following groups are the most preferred for the substituent groups $A^1$ to $A^8$.

One member of each of the pairs $A^1$ and $A^2$, $A^3$ and $A^4$, $A^5$ and $A^6$, $A^7$ and $A^8$ is —O—C $(R^1)(R^3)$—$R^2$, and the other member of each pair is a hydrogen atom.

In the aforementioned formula, $R^1$, $R^3$ are alkyl groups, fluorine-substituted alkyl groups or a hydrogen atom. $R^2$ is an alkyl group, or a substituted or an unsubstituted aryl group.

Examples of $R^1$, $R^3$ are methyl, ethyl, propyl, isopropyl, n-propyl, butyl, n-butyl, sec-butyl, tert-butyl, —$CF_3$, —$C_2F_5$, —$CF(CF_3)_2$ or a hydrogen atom. Of these, it is preferred that both $R^1$, $R^3$ are —$CF^3$. This is due to the fact that when —$CF^3$ is used, the thermal decomposition temperature (T2) falls, and recording sensitivity/jitter characteristics improve.

Examples of $R^2$ are phenyl, naphthyl, 2-methylphenyl, 2,4-dimethylphenyl, 2,4,6-trimethylphenyl, 2-isopropylphenyl, 2,5-dimethylphenyl, 2,6-dimethylphenyl and 2-ethylphenyl.

It is preferred that the number of carbon atoms in the alkyl group assigned to phenyl is 1–4. If the number of carbon atoms increases further, the absorbance per unit film thickness of the recording layer tends to decline, and it becomes difficult to obtain a satisfactory complex refractive index.

The phthalocyanine compound shown by the general formula (1) can easily be synthesized by a cyclization reaction of a corresponding phthalonitrile mixture. Specifically, the phthalonitrile of the following general formula (2) can easily be synthesized by, for example, performing a pyrogenetic reaction in alcohol with a metal derivative in the presence of 1,8-diazabicyclo [5,4,0]-7-undecene.

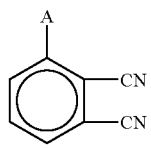

(2)

where, in the formula, A represents the same as the aforementioned $A^1$–$A^8$.

The recording layer comprising the phthalocyanine compound is obtained easily by dissolving the phthalocyanine compound in a solvent, and coating it on a substrate as a liquid. Further, when the central metal M is $Fe^{2+}$, $Co^{2+}$, $Zn^{2+}$, $Cd^{2+}$, $Mn^{2+}$, it is desirable to add an amino compound.

When the central metal M is $Fe^{2+}$, $Co^{2+}$, $Zn^{2+}$, $Cd^2$, $Mn^{2+}$, the amino compound easily coordinates with M, and solubility in the solvent and coating film-forming properties are improved by the coordination. The following compounds can be used as the amino compound, although these are not exhaustive.

There is no particular limitation on the amino compound, which may be selected depending on the purpose. Examples are n-butylamine, n-hexylamine, tert-butylamine, pyrrole, pyrrolidine, pyridine, piperidine, purine, imidazole, benzimidazole, 5,6-dimethylbenzimidazole, 2,5,6-trimethylbenzimidazole, naphthimidazole, 2-methylnaphthimidazole, quinoline, isoquinoline, quinoxaline, benzoquinoline, phenanthridine, indoline, carbazole, norharman, thiazole, benzothiazole, benzoxazole, benzotriazole, 7-azaindole, tetrahydroquinoline, triphenylimidazole, phthalimide, benzoisoquinoline-5,10-dione, triazine, perimidine, 5-chlorotriazole, ethylenediamine, azobenzene, trimethylamine, N,N-dimethylformamide, 1(2H) phthalazine, phthalohydrazide, 1,3-diiminoisoindoline, oxazole, polyimidazole, polybenzimidazole and polythiazole.

Of these, compounds having a N atom in the heterocyclic ring are preferred as they strongly prevent association with the phthalocyanine compound, and they have superior durability (heat resistance, light resistance). Furthermore, from the viewpoint of maintaining the thermal stability of the recording layer, it is preferred that the amino compound has a melting point equal to or higher than 150° C.

When the melting point of the amino compound is less than 150° C., the characteristics (especially optical characteristics) of the recording layer vary more easily in a high temperature, high humidity environment.

Of these, imidazole, benzoimidazole and thiazole derivatives are particularly preferred.

As the organic dye material, a third constituent may if necessary be added to the phthalocyanine compound represented by the general formula (1), e.g., a binder or stabilizer.

It is preferred that the film thickness of the recording layer is 100–5000 Å, and particularly preferred that it is 500–3000 Å. This is because, if the film thickness of the recording layer is thinner than this, the recording sensitivity falls, and if it is thicker, the reflectance falls.

The substrate may be chosen from any of the materials conventionally used as a substrate of an information recording medium.

Examples of the substrate material are, for example, acrylic resins such as for example polymethyl methacrylate, polyvinylchloride resins such as polyvinylchloride or vinyl chloride copolymers, epoxy resins, polycarbonate resins, amorphous polyolefins, polyester, glass such as soda-lime glass and ceramics. Of these, polymethylmethacrylate, polycarbonate resins, epoxy resins, amorphous polyolefins, polyesters and glass are desirable from the viewpoint of dimensional stability, transparency and flatness.

A base layer may be provided on the side comprising the recording layer for the purpose of improving flatness, improving adhesion and preventing change of the recording layer.

Examples of the base layer are polymer materials such as polymethyl methacrylate, acrylic acid/methacrylic acid copolymer, styrene/maleic anhydride copolymer, polyvinyl alcohol, N-methylolacrylamide, styrene/sulfonic acid copolymer, styrene/vinyltoluene copolymer, chlorosulfonated polyethylene, nitrocellulose, polyvinyl chloride, polyolefin chloride, polyester, polyimide, vinyl acetate/vinyl chloride copolymer, ethylene/vinyl acetate copolymer, polyethylene, polypropylene, polycarbonate; organic substances such as silane coupling agents; and inorganic substances such as inorganic oxides ($SiO_2$, $Al_2O_3$) and inorganic fluorides ($MgF_2$)

The layer thickness of the base layer is preferably in the range 0.005–20 µm, but preferably in the range 0.01–10 µm.

Also, a reflecting layer is provided on the recording layer to improve S/N-ratio, reflectance and sensitivity during recording. The light reflecting substance which is the material of the reflecting layer is a substance which has a high reflectance to laser light.

Examples of the reflection layer material are metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si. Of these, Au, Al and Ag are preferred. These substances may be used separately, or two or more may be used in combination or as an alloy.

The film thickness of the reflecting layer is generally in the range 100–3000 Å.

A protective layer is provided on the recording layer (or reflecting layer) to provide physical and chemical protection for the recording layer. This protective layer may also be provided to increase resistance to scratches and humidity on the side of the substrate where the recording layer is not provided. Examples of materials which may be used as the protective layer are inorganic substances such as Si, O, $SiO_2$, $MgF_2$, $SnO_2$, thermoplastic resins, thermocuring resins and UV curing resins.

The layer thickness of the protective layer is generally in the range of 500 Å–50 µm.

<Manufacture of Optical Recording Medium>

Next, the manufacture of the optical recording medium of this invention will be described.

In the method of manufacturing the optical recording medium of this invention, a recording layer having an organic dye material as its main component is provided by a coating film-forming means, either directly or at least intervening another layer, on a substrate in which a guide groove is formed on the front surface, a light reflecting layer is formed thereon either directly or at least intervening another layer by a vacuum film-forming means, and a protective layer is formed thereon.

Specifically, the method of manufacturing this optical recording medium comprises the following steps:

(a) providing a recording layer having an organic dye material as its main component by a coating film-forming means, either directly or at least intervening another layer, on a substrate in which a guide groove is formed on the front surface (b) providing a light reflection layer, either directly or at least intervening another layer, on the recording layer by a vacuum film-forming means, and (c) providing a protective layer on the recording layer.

Recording Layer Forming Step

In the method of this invention, a recording layer having an organic dye material as its main component is provided by a coating film-forming means, either directly or at least intervening another layer, on a substrate in which a guide groove is formed on the front surface. Specifically, the recording layer is formed by dissolving an organic dye material having thermal decomposition properties in a solvent, and coating this as a liquid coating solution on the substrate. Any organic solvent known in the art can be used to prepare this coating solution (e.g., alcohol, cellusolve, halogenated hydrocarbons, ketones or ethers). As the coating method, spin coating is preferred as the thickness of the layer can be controlled by adjusting the concentration, viscosity and drying temperature of the solvent.

A base coating layer may be provided on the front surface of the substrate on the same side as the recording layer to improve the flatness of the substrate surface, improve adhesive force or prevent variation in the properties of the recording layer.

In this case, this base coating layer may be formed for example by dispersing a base coating layer material in a suitable solvent to prepare a coating solution, and applying it to the substrate front surface by a coating method such as spin coating, dip coating or extrusion coating.

Light Reflecting Layer Forming Step

The light reflecting layer may be formed on the recording layer for example by vapour deposition, sputtering or ion plating of a light reflecting substance.

Protective Layer Forming Step In the method of this invention, a protective layer is formed on the light reflecting layer. Specifically, it may be formed by vacuum film-forming or coating film-forming of a protective layer material comprising the aforementioned inorganic substances or various resins. In particular, it is preferred to use a UV curing resin and to cure it by irradiating it with ultraviolet light after spin coating.

EXAMPLES

This invention will now be described in detail by means of specific examples, but the invention should not be construed as being limited by the examples in any way.

Example 1

A substrate having an undulating guide groove pattern of depth approximately 1500 Å for reproducing at a track pitch of 1.6 µm and a linear speed of 1.2 m/s was provided on the front surface of a polycarbonate circular plate of diameter 120 mm and thickness 1.2 mm.

The organic dye material was a phthalocyanine (A) having the following general formula (1) where M and $A^1$–$A^8$ had the significance shown in Table 1.

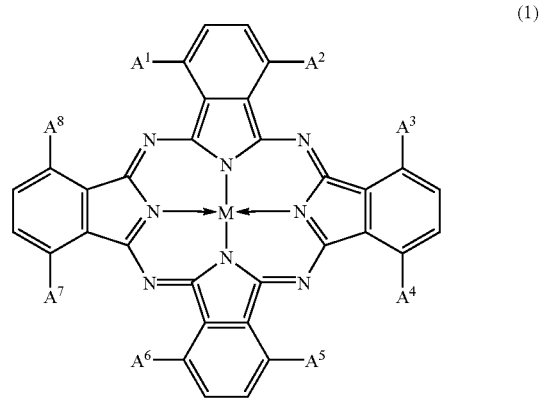

(1)

where, in the formula, one member of each of the pairs $A^1$ and $A^2$, $A^3$ and $A^4$, $A^5$ and $A^6$, $A^7$ and $A^8$ is alkyl group, alkoxy group, phenyl group, alkylthio group, aryl group, aryloxy group or arylthio group, in particular —O—C($R^1$)($R^3$)—$R^2$, and the other member of each pair is halogen, a nitro group, a CN group or a hydrogen atom.

TABLE 1

| | M | $A^{1-8}$ (other member is H) | | | Thermal decomposition temperature |
|---|---|---|---|---|---|
| | | $R^1$ | $R^3$ | $R^2$ | |
| Phthalocyanine (A) | VO | $CF_3$ | $CF_3$ | Phenyl | 250° C. |

Next, the phthalocyanine (A) was dissolved in a mixed solvent of tetrahydrofuran, 2-methoxyethanol and methylcyclohexane, and spin-coated as a coating solution to form a recording layer.

In the part of the disk at a radius of 25 mm, the film thickness of the recording layer was approximately 1500 Å, and in the part of the disk at a radius of 55 mm, it was approximately 1650 Å. Also, the thermal decomposition temperature of the phthalocyanine (A) as found by a thermal balance was 250° C.

Next, Ag was deposited to a thickness of approximately 1400 Å on the recording layer by sputtering using Ar as the sputtering gas to give a reflecting layer. A protective layer comprising an ultraviolet curing resin (SD1700, Dainippon Ink & Chemicals, Inc.) was then provided thereon to a thickness of approximately 5 μm so as to obtain the optical recording medium of Example 1.

Using a signal tester (DDU-1000, Pulstec Industrial Co., Ltd), an audio data EFM signal was then recorded at a wavelength of 790 nm, NA: 0.5 and a linear speed of 14.4 m/s, played back, and the jitter of this optical recording medium at the inner circumference (disk radius 25 mm) and outer circumference (disk radius 55 mm) was measured by a jitter meter (LJM-1851, LEADER ELECTRONICS CORP.). The results are shown in Table 4.

<Recording Pulse Length>

The EFM recording signal pulse had the following characteristics:

(n–X)×231.4 ns n is the signal pattern (T), 3, 4, 5, 6, 7, 8, 9, 10, 11 where, X=0 at the inner circumference where the disk radius was 25–50 mm, and X=–0.5 at the outer circumference where the disk radius was 50–58 mm.

Example 2

The optical recording medium of Example 2 was prepared in an identical manner to that of Example 1, except that the phthalocyanine (A) was replaced by a phthalocyanine (B) wherein, in the above general formula (1), M, $A^1$–$A^8$ are as shown in Table 2. The thermal decomposition temperature of the phthalocyanine (B) was 340° C.

TABLE 2

| | M | $A^1$–$A^8$ (one member) | $A^1$–$A^8$ (other member) | Thermal decomposition temperature |
|---|---|---|---|---|
| Phthalocyanine (B) | Pd | —O—CH(CH(CH$_3$)$_2$)$_2$ | Br | 340° C. |

Next, the recording characteristics of the optical recording medium in Example 2 were evaluated in an identical manner to that of the evaluation of the recording characteristics in Example 1. The results are shown in Table 4.

Comparative Example 1

The optical recording medium of Comparative Example 1 was prepared in an identical manner to that of Example 1, except that the recording pulse length was not varied between the disk inner circumference and outer circumference. The recording was performed with X=0 at the inner circumference where the disk radius was 25–50 mm, and X=0 at the outer circumference where the disk radius was 50–58 mm.

Next, the recording characteristics of the optical recording medium in Comparative Example 1 were evaluated in an identical manner to that of the evaluation of Example 1. The results are shown in Table 4.

Comparative Example 2

The optical recording medium of Comparative Example 2 was prepared in an identical manner to that of Example 1, except that the organic dye material was Solvent Blue (Cu phthalocyanine compound) spin-coated by 2, 2, 3, 3-tetrafluoropropanol. The thermal decomposition temperature of this dye was 450° C. or higher.

Next, the recording characteristics of the optical recording medium in Comparative Example 2 were evaluated in an identical manner to that of the evaluation of the recording characteristics of Example 1. The results are shown in Table 4.

Comparative Example 3

The optical recording medium of Comparative Example 3 was prepared in an identical manner to that of Example 1, except that the phthalocyanine (A) was replaced by a phthalocyanine (C) wherein, in the above general formula (1), M, $A^1$–$A^8$ are as shown in Table 3. The thermal decomposition temperature of the phthalocyanine (C) was 190° C.

Next, the recording characteristics of the optical recording medium in Comparative Example 3 were evaluated in an identical manner to that of the evaluation of the recording characteristics of Example 1. The results are shown in Table 4.

TABLE 3

| | M | $A^1$–$A^8$ (one member) | $A^1$–$A^8$ (other member) | Thermal decomposition temperature |
|---|---|---|---|---|
| Phthalocyanine (C) | VO | —S—CH$_2$C$_6$H$_5$ | H | 190° C. |

TABLE 4

| Recording medium | 3T pit jitter (ns) | |
|---|---|---|
| | 25 mm | 55 mm |
| Example 1 | 17 | 20 |
| Example 2 | 20 | 25 |
| Comparative Example 1 | 17 | 38 |

TABLE 4-continued

| Recording medium | 3T pit jitter (ns) | |
| --- | --- | --- |
| | 25 mm | 55 mm |
| Comparative Example 2 | Recording impossible | recording impossible |
| Comparative Example 3 | 40 or higher | 40 or higher |

From the results of Table 4, it was found that with the optical recording medium of Example 1, good jitter characteristics satisfying the specification (35 ns or less) were obtained at β=4%. The recording laser power at 25 mm was 19.3 mW.

With the optical recording medium of Example 2, good jitter characteristics satisfying the specification were obtained as in the case of Example 1.

The optical recording media of Examples 1, 2 could be played back on a commercial CD player.

On the other hand, with the optical recording medium of Comparative Example 1, the specification value (35 ns or less) was not satisfied at the outer circumference (55 mm).

With the optical recording medium of Comparative Example 2, recording could not be performed due to insufficient sensitivity at a laser power of 25 mW or less.

With the optical recording medium of Comparative Example 3, the specified value (35 ns or less) was not satisfied at β=4%.

Examples 3–12

Figure 2:
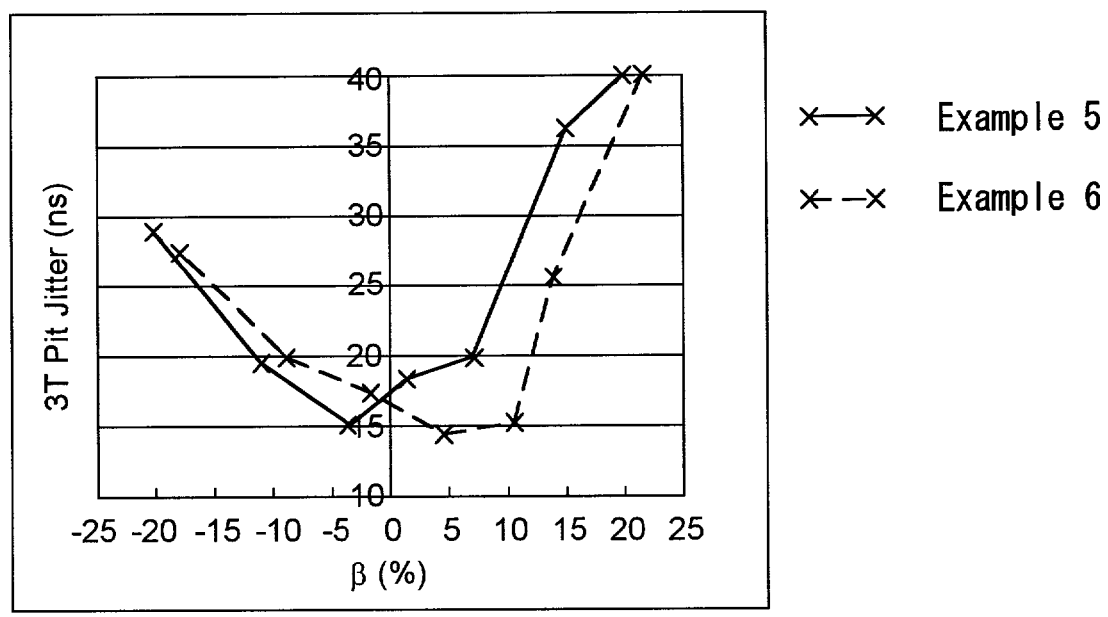
FIG. 2 is a graph showing the relation between a β range and jitter in Examples 5, 6.
Figure 3:
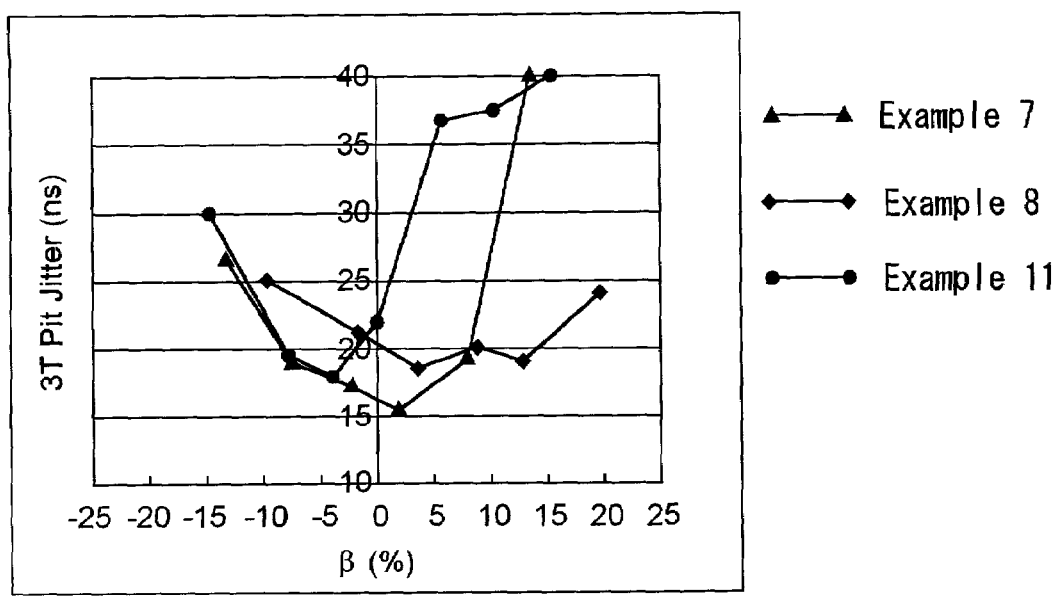
FIG. 3 is a graph showing the relation between a β range and jitter in Examples 7, 8 and 11.
Figure 4:
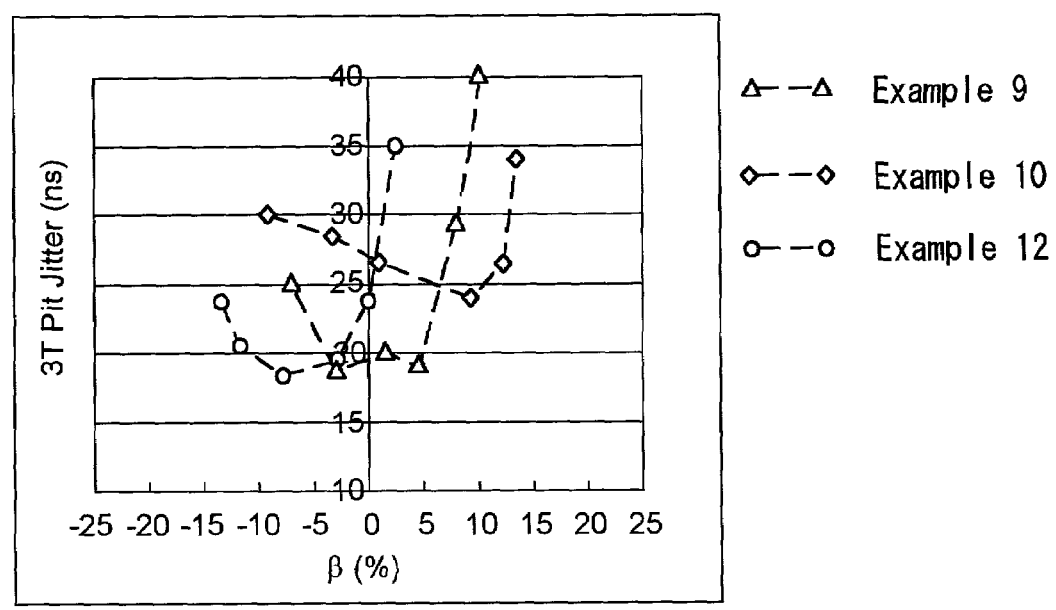
FIG. 4 is a graph showing the relation between a β range and jitter in Examples 9, 10 and 12.

In Example 1, the jitter margin relative to the recording power was measured, varying the linear recording speed (Vw) and X of the EMF recording signal pulse as shown in Table 5. The results are shown in Table 5 and FIGS. 1–4.

TABLE 5

| | Vw | Vw/Vr | X | 0.08 × Vw/Vr + X |
| --- | --- | --- | --- | --- |
| Example 3 | 4.8 | 4 | 0.5 | 0.82 |
| Example 4 | 4.8 | 4 | 0 | 0.32 |
| Example 5 | 9.6 | 8 | 0.5 | 1.14 |
| Example 6 | 9.6 | 8 | 0 | 0.64 |
| Example 7 | 14.4 | 12 | 0 | 0.96 |
| Example 8 | 14.4 | 12 | −0.5 | 0.46 |
| Example 9 | 19.2 | 16 | −0.5 | 0.78 |
| Example 10 | 19.2 | 16 | −1 | 0.28 |
| Example 11 | 14.4 | 12 | 0.5 | 1.46 |
| Example 12 | 19.2 | 16 | 0 | 1.28 |

As can be seen from the results of Table 5 and FIGS. 1–4, in Examples 3–10 which satisfied the recording pulse conditions of 0.25≦0.08×Vw/Vr+X≦1.25 [Vw is recording speed, Vr is standard reproducing speed for CD (1.2 m/s–1.4 m/s)], satisfactory jitter was obtained over a wide β range, but in Examples 11 and 12, which did not satisfy the recording pulse conditions, the satisfactory jitter range was narrower.

In the method for recording on the optical recording medium of this invention, the thermal decomposition temperature of the recording layer is from 200 to less than 450° C., and when the pit length-modulated recording marks are formed, recording is performed by the shortest signal recording pulse suited to the thermal decomposition characteristics of the recording layer by varying the shortest signal recording pulse length between the disk inner circumference and outer circumference, so satisfactory recording/reproducing signal characteristics are obtained even under high-speed recording conditions.

In the method for recording on the optical recording medium of this invention, the thermal decomposition temperature of the recording layer is from 200 to less than 450° C., and when the pit length-modulated recording marks are formed, recording is performed by a recording pulse suited to the thermal decomposition characteristics of the recording layer by varying the second shortest signal recording pulse length between the disk inner circumference and outer circumference, so satisfactory recording/reproducing signal characteristics are obtained even under high-speed recording conditions.

In the optical recording medium of this invention, recording is performed by a recording signal pulse suited to the thermal decomposition characteristics, so playable data pits can be formed under high-speed recording conditions.

Therefore, according to this invention, recorded disks can be manufactured speedily and easily.

What is claimed is:

1. An optical recording method comprising a step for irradiating an optical recording medium with a recording light comprising a recording signal, wherein the optical recording medium comprises a substrate having guide grooves thereon and a recording layer disposed on or above the surface of the substrate where the guide grooves are provided, and the recording light is irradiated to the substrate of the optical recording medium to form a recording mark having a modulated pit length on a recording layer of the recordable optical recording medium, the recording layer comprises a dye material which has a thermal decomposition temperature of 200° C. to less than 450° C. above the substrate, wherein the shortest recording signal is a single recording pulse (3T pulse), and lengths of the shortest recording signal pulse at an outer circumference of the recordable optical recording medium and at an inner circumference are adjusted by a factor X such that the length of the shortest recording signal pulse at the outer circumference of the recordable optical recording medium is longer than the length of the shortest recording signal pulse at the inner circumference, the recording signal is a compact disc (CD) signal, the recording is carried out at a constant linear speed, and the shortest signal recording pulse (3T pulse) length is recorded as (3−X)×231.4 ns, where 0.25<0.08 ×Vw/Vr+X<1.25, Vw is the recording speed, and Vr is the standard reproducing speed for CD (1.2 m/s–1.4 m/s), and satisfies −2<X<2.

2. An optical recording method according to claim 1, wherein the recordable optical recording medium further comprises a reflecting layer disposed directly or via other layer, on a side of the recording layer which is opposite the substrate.

3. An optical recording method according to claim 1, wherein the 3T pulse length variation amount between the inner circumference and outer circumference of said optical recording medium is 5% to 20%.

4. An optical recording method according to claim 1, wherein the dye material is a phthalocyanine compound represented by the following general formula (1):

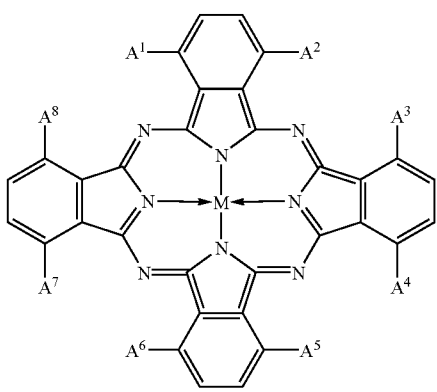

(1)

(in the formula, M represents a bivalent metal atom, mono-substituted trivalent metal atom, disubstituted tetravalent metal atom or oxymetal, and among $A^1$ and $A^2$, $A^3$ and $A^4$, $A^5$ and $A^6$, $A^7$ and $A^8$, one of the pair represents an alkyl group, alkylthio group, alkoxy group, aryl group, aryloxy group or arylthio group, and the other of the pair represents halogen, a nitro group, a CN group or a hydrogen atom).

5. An optical recording method according to claim 4, wherein M in the general formula (1) is a metal atom or metal oxide chosen from one of Zn, Ni, Cu, Pd, VO and TiO.

6. An optical recording method according to claim 4, wherein, in the general formula (1), among $A^1$ and $A^2$, $A^3$ and $A^4$, $A^5$ and $A^6$, $A^7$ and $A^8$, one of each of the pairs represents a straight chain, branched or cyclic alkyl group, alkoxy group or alkylthio group having 1–10 carbon atoms or an aryl group, aiyloxy group or arylthio group having 6–20 carbon atoms, and the other of the pair represents a halogen, a nitro group, a CN group or a hydrogen atom.

7. An optical recording method according to claim 4, wherein, in the general formula (1), among $A^1$ and $A^2$, $A^3$ and $A^4$, $A^5$ and $A^6$, $A^7$ and $A^8$, one of each of the pairs represents —O—C ($R^1$) ($R^3$)—$R^2$, where $R^1$, $R^3$ represent an alkyl group, fluorine-substituted alkyl group or hydrogen atom, and $R^2$ represents an alkyl group, or substituted or unsubstituted aryl group, and the other of each pair represents a hydrogen atom.

8. The optical recording method according to claim 1, where in the thermal decomposition temperature of the dye material is 250° C. to 400° C.

9. An optical recording medium in which data pits are formed by an optical recording method which irradiates a recording light containing a recording signal to a rear surface side of a substrate having a guide groove on at least a front surface thereof to form a recording mark having a modulated pit length on a recording layer having a dye material which has a thermal decomposition temperature of 200° C. to less than 450° C. above the substrate, wherein the shortest recording signal is a single recording pulse (3T pulse), and lengths of the shortest recording signal pulse at an outer circumference of the recordable optical recording medium and at an inner circumference are adjusted by a factor X such that the length of the shortest recording signal pulse at the outer circumference of the recordable optical recording medium is longer than the length of the shortest recording signal pulse at the inner circumference, the recording signal is a compact disc (CD) signal, the recording is carried out at a constant linear speed, and the shortest signal recording pulse (3T pulse) length is recorded as (3−X)×231.4 ns, where 0.25<0.08 ×Vw/Vr+X<1.25, Vw is the recording speed, and Vr is the standard reproducing speed for CD (1.2 m/s–1.4 mis), and satisfies −2<X<2.

10. An optical recording medium according to claim 9, wherein the optical recording medium is used for CD-R.

11. An optical recording method comprising a step for irradiating an optical recording medium with a recording light comprising a recording signal, wherein the optical recording medium comprises a substrate having guide grooves thereon and a recording layer disposed on or above the surface of the substrate where the guide grooves are provided, and the recording light is irradiated to the substrate of the optical recording medium to form a recording mark having a modulated pit length on a recording layer of the recordable optical recording medium, the recording layer comprises a dye material which has a thermal decomposition temperature of 200° C. to less than 450° C. above the substrate, wherein the second shortest recording signal is a single recording pulse (4T pulse) and the length of the 4T pulse at an outer circumference of the recordable optical recording medium is longer than the length of the 4T pulse at an inner circumference, the recording signal is a compact disc (CD) signal, the recording is carried out at a constant linear speed, and the second shortest signal recording pulse (4T pulse) length of the CD signal is recorded as (4−X)×231.4 ns, where 0.25<0.08 ×Vw/Vr+X<1.25, Vw is the recording speed, and Vr is the standard reproducing speed for CD (1.2m/s–1.4m/s), and satisfies −2<X<2.

12. An optical recording method according to claim 11, wherein the recordable optical recording medium further comprises a reflecting layer disposed directly or via other layer, on a side of the recording layer which is opposite the substrate.

13. An optical recording method according to claim 11, wherein the 4T pulse length variation amount between the inner circumference and outer circumference of said optical recording medium is 5% to 20%.

14. An optical recording method according to claim 11, wherein the dye material is a phthalocyanine compound represented by the following general formula (1):

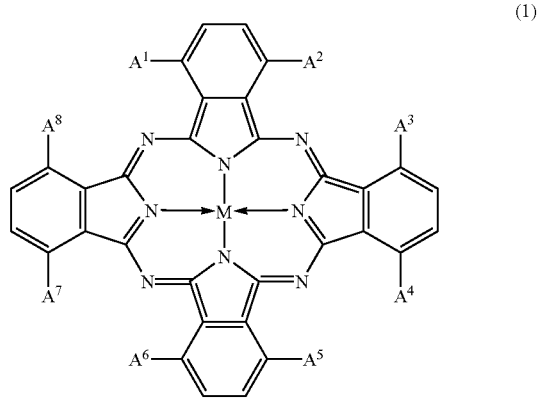

(1)

(in the formula, M represents a bivalent metal atom, mono-substituted trivalent metal atom, disubstituted tetravalent metal atom or oxymetal, and among $A^1$ and $A^2$, $A^3$ and $A^4$, $A^5$ and $A^6$, $A^7$ and $A^8$, one of the pair represents an alkyl group, alkylthio group, alkoxygroup, aryl group, aryloxy group or arylthio group, and the other of the pair represents halogen, a nitro group, a CN group or a hydrogen atom).

15. An optical recording method according to claim 14, wherein M in the general formula (1) is a metal atom or metal oxide chosen from one of Zn, Ni, Cu, Pd, VO and TiO.

16. An optical recording method according to claim 14, wherein, in the general formula (1), among $A^1$ and $A^2$, $A^3$ and $A^4$, $A^5$ and $A^6$, $A^7$ and $A^8$, one of each of the pairs represents a straight chain, branched or cyclic alkyl group, alkoxy group or alkylthio group having 1–10 carbon atoms or an aryl group, aryloxy group or arylthio group having 6–20 carbon atoms, and the other of the pair represents halogen, a nitro group, a CN group or a hydrogen atom.

17. An optical recording method according to claim 14, wherein, in the general formula (1), among $A^1$ and $A^2$, $A^3$ and $A^4$, $A^5$ and $A^6$, $A^7$ and $A^8$, one of each of the pairs represents —O—C($R^1$)($R^3$)—$R^2$, where $R^1$, $R^3$ represent an alkyl group, fluorine-substituted alkyl group or hydrogen atom, and $R^2$ represents an alkyl group, or substituted or unsubstituted aryl group, and the other of each pair represents a hydrogen atom.

18. An optical recording method according to claim 11, wherein the thermal decomposition temperature of the dye material is 250° C. to 400° C.

19. An optical recording medium in which data pits are formed by an optical recording method which irradiates a recording light containing a recording signal to a rear surface side of a substrate having a guide groove on at least a front surface thereof to form a recording mark having a modulated pit length on a recording layer having a dye material which has a thermal decomposition temperature of 200° C. to less than 450° C. above the substrate, wherein the second shortest recording signal is a single recording pulse (4T pulse) and the length of the 4T pulse at an outer circumference of the recordable optical recording medium is longer than the length of the 4T pulse at an inner circumference, the recording signal is a compact disc (CD) signal, the recording is carried out at a constant linear speed, and the second shortest signal recording pulse (4T pulse) length is recorded as $(4-X) \times 231.4$ ns, where $0.25 < 0.08 \times Vw/Vr + X < 1.25$, Vw is the recording speed, and Vr is the standard reproducing speed for CD (1.2 m/s–1.4 m/s), and satisfies $-2 < X < 2$.

20. An optical recording medium according to claim 19, wherein the optical recording medium is used for CD-R.

21. The optical recording method according to claim 1, wherein the factor X at the inner circumference of the optical recording medium is different than the factor X at the outer circumference of the optical recording medium.

* * * * *